(12) United States Patent
Kazandjian et al.

(10) Patent No.: US 12,710,544 B2
(45) Date of Patent: Aug. 18, 2026

(54) SENSOR ASSEMBLY

(71) Applicant: Ford Global Technologies, LLC, Dearborn, MI (US)

(72) Inventors: Vahan Kazandjian, Warrington, PA (US); Rashaun Phinisee, Ypsilanti, MI (US); Michael Robertson, Jr., Garden City, MI (US); Subba Reddy Boggu, Prakasam Dist (IN); Pavan Kumar Mummadi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 916 days.

(21) Appl. No.: 18/066,324

(22) Filed: Dec. 15, 2022

(65) Prior Publication Data

US 2024/0201330 A1 Jun. 20, 2024

(51) Int. Cl.
*G01S 17/931* (2020.01)

(52) U.S. Cl.
CPC .................................. *G01S 17/931* (2020.01)

(58) Field of Classification Search
CPC ....... G01S 7/4813; G01S 17/93; G01S 17/931
See application file for complete search history.

(56) References Cited

U.S. PATENT DOCUMENTS 10,627,488 B2 4/2020 Dubey et al.
10,823,824 B2 11/2020 Schmidt
11,156,485 B1 10/2021 Krishnan et al.
11,520,012 B2 * 12/2022 Robertson, Jr. ....... G01S 7/4813
11,781,549 B1 * 10/2023 Acharya ............... G01S 17/931 415/208.1
11,835,660 B2 * 12/2023 Vitanov ................ G01S 17/931
12,449,513 B2 * 10/2025 Robertson, Jr. ....... G01S 7/4813
12,461,204 B2 * 11/2025 Robertson, Jr. ....... G01S 7/4813
2020/0033480 A1 1/2020 Augspurger et al.
2020/0191614 A1 6/2020 Ellgas et al.
2020/0271759 A1 8/2020 Hattass et al.
2020/0309913 A1 10/2020 Oliveira et al.
2020/0387174 A1 12/2020 Diehl et al.
(Continued)

FOREIGN PATENT DOCUMENTS

CN 208997028 U 6/2019
CN 110412542 A 11/2019
(Continued)

*Primary Examiner* — Brian O Peters
(74) *Attorney, Agent, or Firm* — Frank A. MacKenzie; Brooks Kushman P.C.

(57) ABSTRACT

A sensor assembly includes a housing, a sensor unit attached to the housing, and an airfoil blade. The sensor unit includes a cylindrical shell defining a vertical axis. The cylindrical shell is rotatable around the axis relative to the housing. The cylindrical shell includes a lower edge and extends along the axis from the lower edge. The housing includes an aperture centered on the axis. The aperture defines an airflow outlet from the housing radially inside the aperture relative to the axis. The sensor unit defines an airflow inlet radially inside the lower edge relative to the axis and is positioned to receive airflow from the aperture. A gap is defined between the aperture and the lower edge along the axis. The airfoil blade is positioned at the gap and positioned to interrupt airflow from the housing through the aperture into the cylindrical shell.

20 Claims, 10 Drawing Sheets

(56) References Cited

U.S. PATENT DOCUMENTS

| | | | |
|---|---|---|---|
| 2021/0025983 | A1 | 1/2021 | Patil et al. |
| 2021/0063093 | A1 | 3/2021 | Tobiassen et al. |
| 2021/0103036 | A1 | 4/2021 | Robertson, Jr. et al. |
| 2021/0341584 | A1 | 11/2021 | Ren et al. |

FOREIGN PATENT DOCUMENTS

| | | | |
|---|---|---|---|
| CN | 110736973 | A | 1/2020 |
| CN | 212275973 | U | 1/2021 |
| CN | 213558688 | U | 6/2021 |
| CN | 213899505 | U | 8/2021 |
| EP | 3032278 | A1 | 6/2016 |
| EP | 3481683 | B1 | 10/2020 |
| JP | 4213398 | B2 | 11/2008 |

* cited by examiner 102
100
104
106
134
122
120
118
120
120

100
106
A
110
148
168
140
168
104
136
134

106
158
A
110
148
162
132
128
132
130
174
160
156
112
132
124

106
110
156
144
7
116
112
140
176
178
108
104
128
124
170

SENSOR ASSEMBLY

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
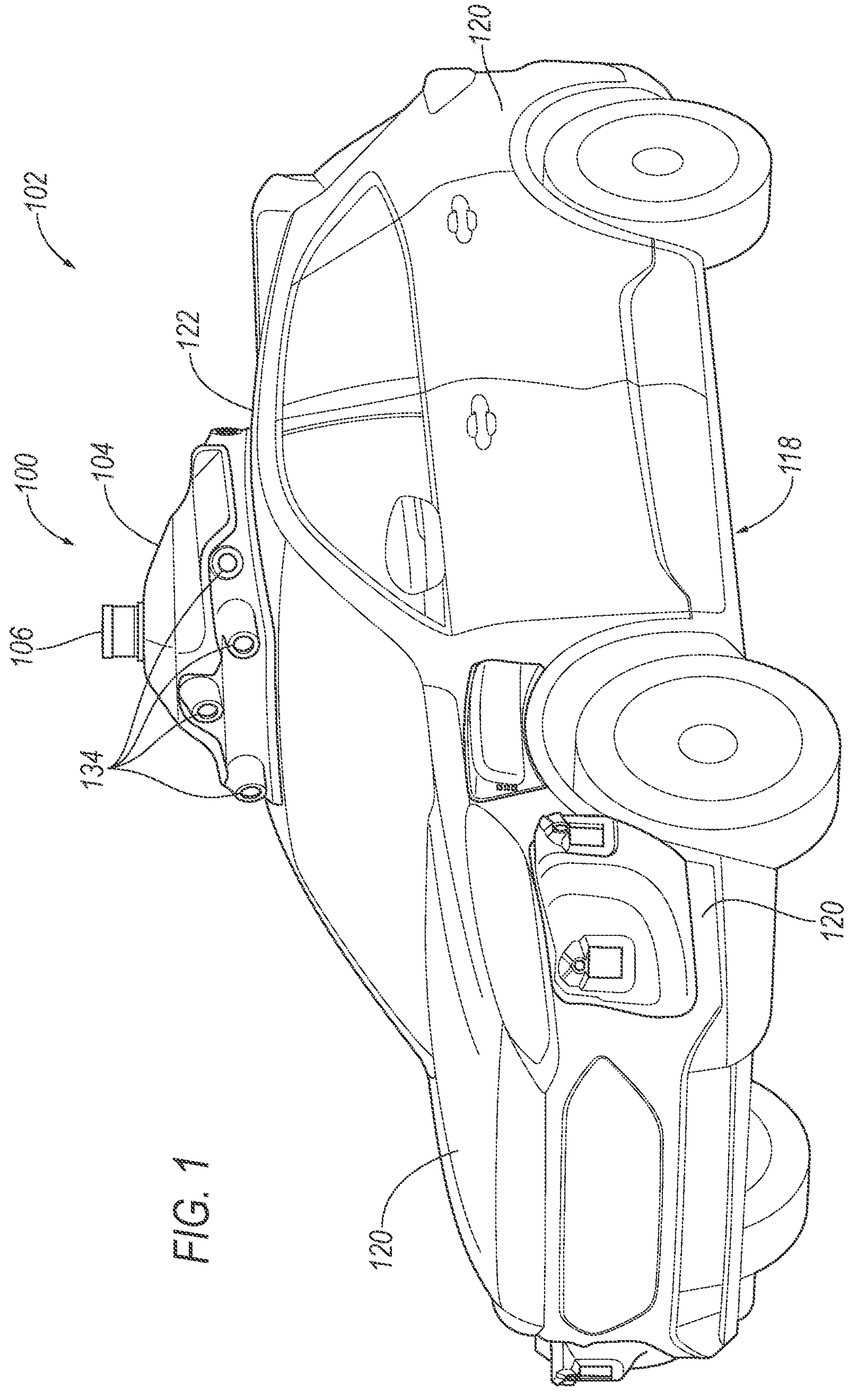
FIG. 1 is a perspective view of an example vehicle with an example sensor assembly.

A sensor assembly includes a housing, a sensor unit attached to the housing, and an airfoil blade. The sensor unit includes a cylindrical shell defining a vertical axis. The cylindrical shell is rotatable around the axis relative to the housing. The cylindrical shell includes a lower edge and extending along the axis from the lower edge. The housing includes an aperture centered on the axis. The aperture defines an airflow outlet from the housing radially inside the aperture relative to the axis. The sensor unit defines an airflow inlet radially inside the lower edge relative to the axis and positioned to receive airflow from the aperture. A gap is defined between the aperture and the lower edge along the axis. The airfoil blade is positioned at the gap and positioned to interrupt airflow from the housing through the aperture.

The sensor assembly may further include a plurality of airfoil blades including the airfoil blade, and the airfoil blades may be arranged circumferentially around the axis. The airfoil blades may be spaced equidistantly from each other around the axis.

The sensor assembly may further include a pressurized-air source positioned to supply the airflow from the housing through the aperture into the cylindrical shell.

The sensor assembly may further include a ring positioned along the axis at the gap and rotatable relative to the housing around the axis, and the airfoil blade may be fixed relative to the ring. The airfoil blade may be arranged to direct airflow axially into the cylindrical shell relative to the axis when the ring rotates relative to the housing.

The cylindrical shell may be rotatable around the axis in a first direction, and the ring may be rotatable around the axis in a second direction opposite the first direction. The airfoil blade may be a first airfoil blade, the sensor assembly may further include a second airfoil blade fixed relative to the cylindrical shell, and the second airfoil blade may be positioned to direct airflow into the gap when the cylindrical shell rotates.

The sensor assembly may further include a first motor positioned to rotatably drive the cylindrical shell relative to the housing at a first speed, and a second motor positioned to rotatably drive the ring relative to the housing at a second speed different than the first speed. The second speed may be greater than the first speed.

The ring may extend circumferentially around the axis.

The ring may include a concave surface facing radially outward relative to the axis and facing toward the cylindrical shell, and the airfoil blade may extend from the concave surface.

The airfoil blade may be fixed relative to the cylindrical shell. The airfoil blade may be positioned to direct airflow into the gap when the cylindrical shell rotates.

A shape of the airfoil blade may include a cross-section that is projected along the axis from the lower edge away from the cylindrical shell. The sensor assembly may further include a gutter fixed relative to the housing and extending around the aperture, the gutter may be elongated along the lower edge and positioned directly below the lower edge relative to the axis, and the airfoil blade may extend into the gutter.

The sensor assembly may further include a gutter fixed relative to the housing and extending around the aperture, and the gutter may be elongated along the lower edge and positioned directly below the lower edge relative to the axis. The gutter may include a channel extending from radially inside the lower edge to radially outside the lower edge relative to the axis.

The sensor unit may include a sensor body fixed relative to the cylindrical shell and defining a cavity radially between the sensor body and the cylindrical shell relative to the axis, and the cavity may extend continuously circumferentially around the sensor body relative to the axis.

The sensor unit may include a LIDAR sensing device.

With reference to the Figures, wherein like numerals indicate like parts throughout the several views, a sensor assembly 100 for a vehicle 102 includes a housing 104, a sensor unit 106 attached to the housing 104, and at least one airfoil blade 172, 174. The sensor unit 106 includes a cylindrical shell 110 defining a vertical axis A. The cylindrical shell 110 is rotatable around the axis A relative to the housing 104. The cylindrical shell 110 includes a lower edge 112 and extends along the axis A from the lower edge 112. The housing 104 includes an aperture 140 centered on the axis A. The aperture 140 defines an airflow outlet 114 from the housing 104 radially inside the aperture 140 relative to the axis A. The sensor unit 106 defines an airflow inlet 116 radially inside the lower edge 112 relative to the axis A and is positioned to receive airflow from the aperture 140. A gap 176 is defined between the aperture 140 and the lower edge 112 along the axis A. The at least one airfoil blade 172, 174 is positioned at the gap 176 and positioned to interrupt airflow from the housing 104 through the aperture 140.

The sensor assembly 100 provides both cooling and water management for a rotating sensor unit 106 on the stationary housing 104. The airflow outlet 114 defined by the aperture 140 provides a path for airflow into the cylindrical shell 110, where the airflow can cool components of the sensor unit 106. Because the cylindrical shell 110 rotates at a high rate of speed relative to the housing 104, the gap 176 is present between the cylindrical shell 110 and the housing 104. The position of the aperture 140 close to the lower edge 112 of the cylindrical shell 110 permits only a small amount of the airflow to escape through the gap 176 between the aperture 140 and the lower edge 112, making the airflow from the housing 104 to the sensor unit 106 efficient despite the fact that the cylindrical shell 110 moves relative to the housing 104. Additionally, the at least one airfoil blade 172, 174 can direct airflow in a way that reduces airflow escaping through the gap 176, e.g., by directing airflow from the housing 104 upward into the cylindrical shell 110 or by drawing outside air into the gap 176.

With reference to FIG. 1, the vehicle 102 may be any suitable type of ground vehicle, e.g., a passenger or commercial automobile such as a sedan, a coupe, a truck, a sport utility, a crossover, a van, a minivan, a taxi, a bus, etc.

The vehicle 102 may be an autonomous vehicle. A computer (not shown) can be programmed to operate the vehicle 102 independently of the intervention of a human driver, completely or to a lesser degree. The computer may be programmed to operate the propulsion, brake system, steering, and/or other vehicle systems based at least in part on data received from the sensor unit 106. For the purposes of this disclosure, autonomous operation means the computer controls the propulsion device, brake system, and steering system without input from a human driver; semi-autonomous operation means the computer controls one or two of the propulsion system, brake system, and steering system and a human driver controls the remainder; and nonautonomous operation means a human driver controls the propulsion system, brake system, and steering system.

The vehicle 102 may include a vehicle body 118. The vehicle body 118 includes body panels 120 partially defining an exterior of the vehicle 102. The body panels 120 may present a class-A surface, e.g., a finished surface exposed to view by a customer and free of unaesthetic blemishes and defects. The body panels 120 include, e.g., a roof 122, etc.

The sensor assembly 100 is attachable to one of the body panels 120 of the vehicle 102, e.g., the roof 122. For example, the housing 104 may be shaped to be attachable to the roof 122, e.g., may have a shape matching a contour of the roof 122. The housing 104 may be attached to the roof 122, which can provide the sensor unit 106 and other sensors 134 mounted inside the housing 104 with an unobstructed field of view of an area around the vehicle 102. The housing 104 may be formed of, e.g., plastic or metal.

Figure 2:
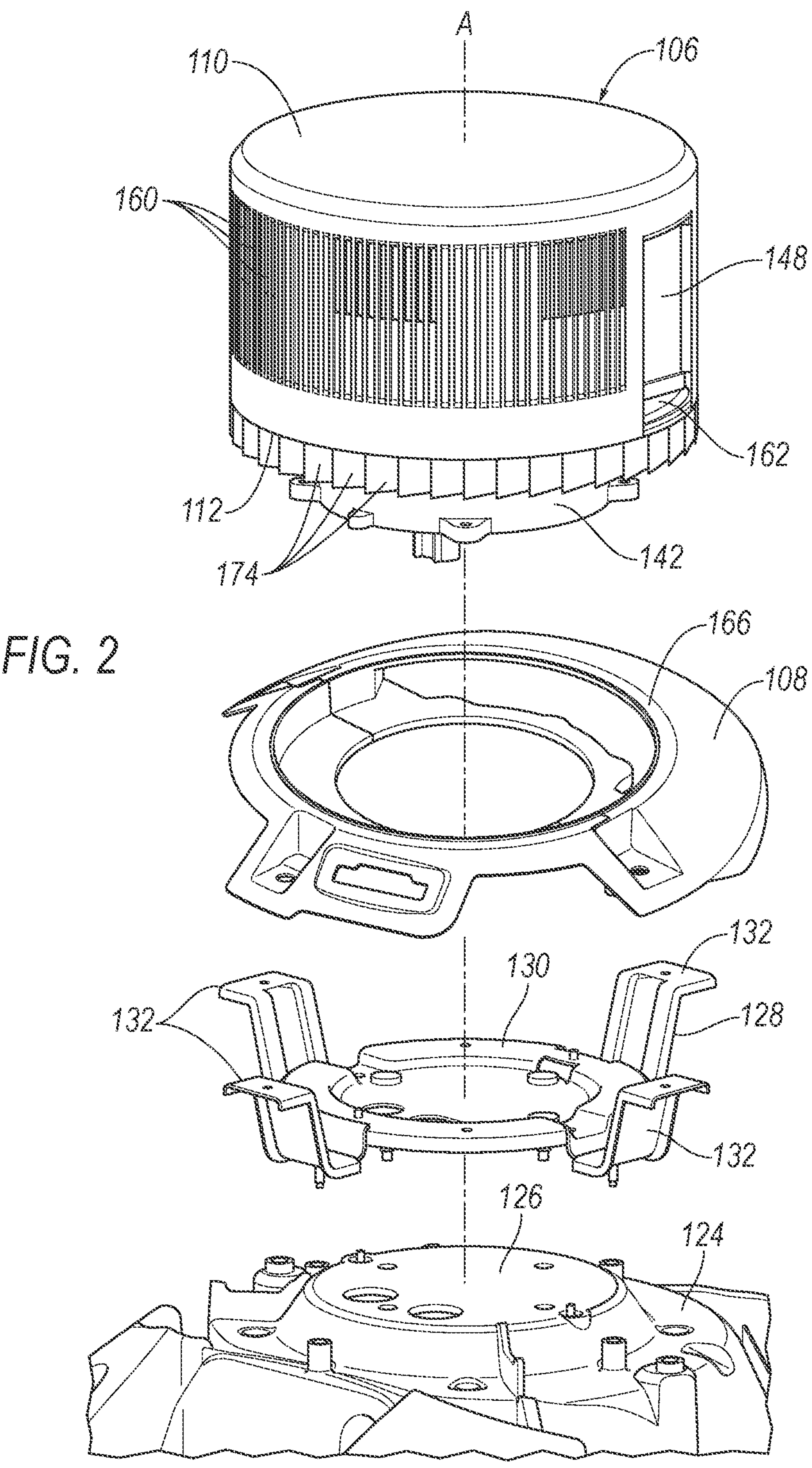
FIG. 2 is an exploded perspective view of a portion of the sensor assembly.
Figure 4:
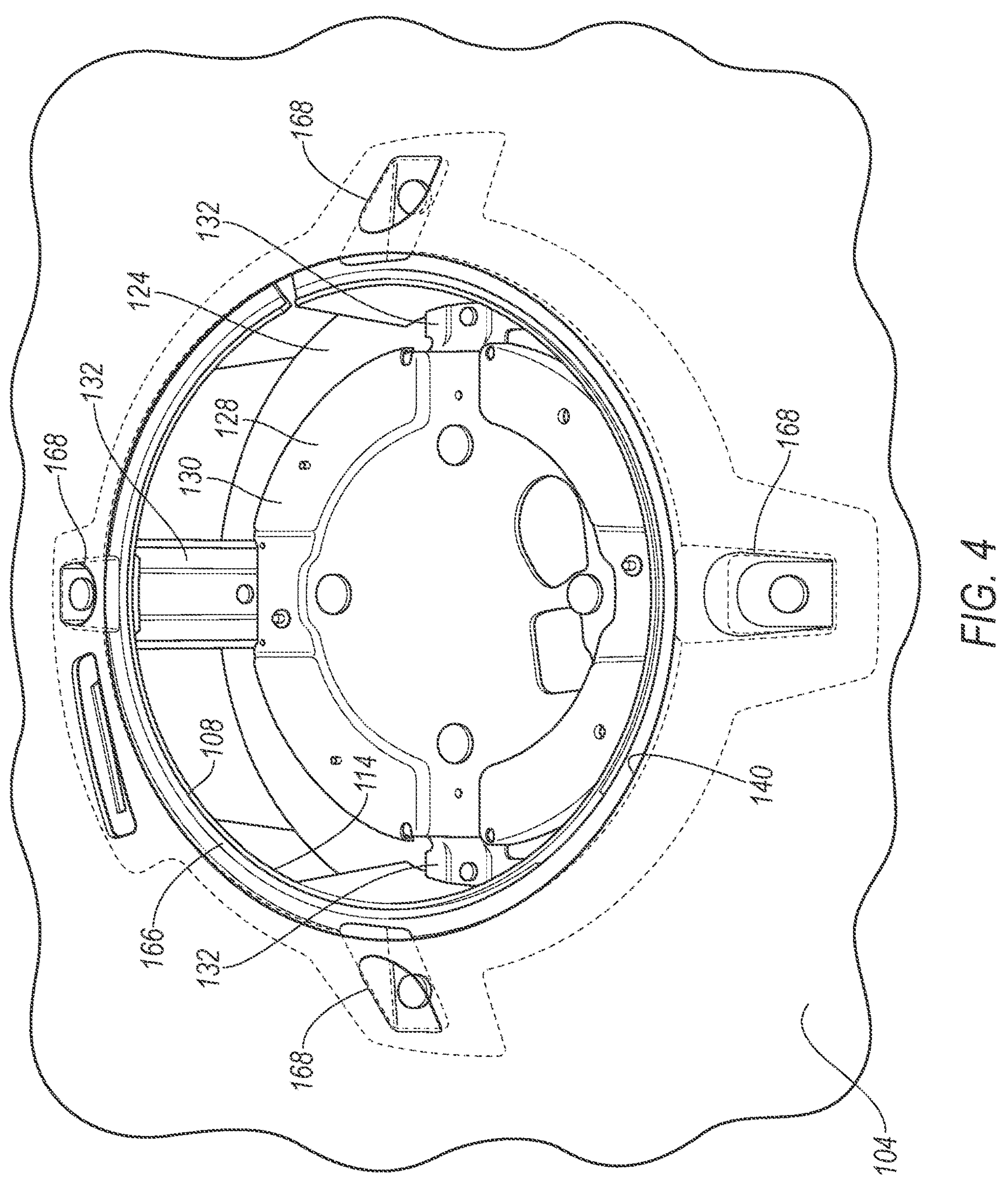
FIG. 4 is a perspective view of a portion of the sensor assembly with a sensor unit removed for illustration.

With reference to FIG. 2, the sensor assembly 100 includes a rigid structure 124. The housing 104 and the rigid structure 124 are shaped to fit together, with the rigid structure 124 positioned inside the housing 104, as seen in FIG. 4. The rigid structure 124 can have a shape matching the contour of the roof 122 like the housing 104 does. The rigid structure 124 can include a mounting platform 126 for directly or indirectly mounting a bracket 128, the gutter 108, and the sensor unit 106. The mounting platform 126 can be round, e.g., can have a circular or slightly elliptical shape, and can be centered on the axis A. The mounting platform 126 can be flat and horizontally level. The rigid structure 124 can be a single piece, i.e., a continuous piece of material with no internal seams separating multiple pieces. For example, the rigid structure 124 can be stamped or molded as a single piece.

The sensor assembly 100 includes a bracket 128 mounted to the rigid structure 124, e.g., fastened to the mounting platform 126. The sensor unit 106 can be mounted to the bracket 128, e.g., fastened through the bracket 128 to the mounting platform 126. The bracket 128 can be a single piece, i.e., a continuous piece of material with no internal seams separating multiple pieces. For example, the bracket 128 can be stamped or molded as a single piece.

The bracket 128 is shaped to accept and fix in place the sensor unit 106, e.g., via fastening. The bracket 128 defines an orientation and position of the sensor unit 106 relative to the body of the vehicle 102. The position of the sensor unit 106 affords the sensor unit 106 a 360° horizontal field of view of the environment surrounding the vehicle 102, as shown in FIG. 1. The bracket 128 can include a circular base 130 centered on the axis A and a plurality of arms 132 extending radially outward and axially upward from the base 130 relative to the axis A.

The sensor assembly 100 includes the gutter 108. The gutter 108 is fastened to the bracket 128, e.g., to the arms 132 of the bracket 128. The gutter 108 is fixed relative to the housing 104 via the bracket 128. The gutter 108 has a circular shape centered on the axis A. The shape of the gutter 108 is addressed in more detail below.

Figure 3:
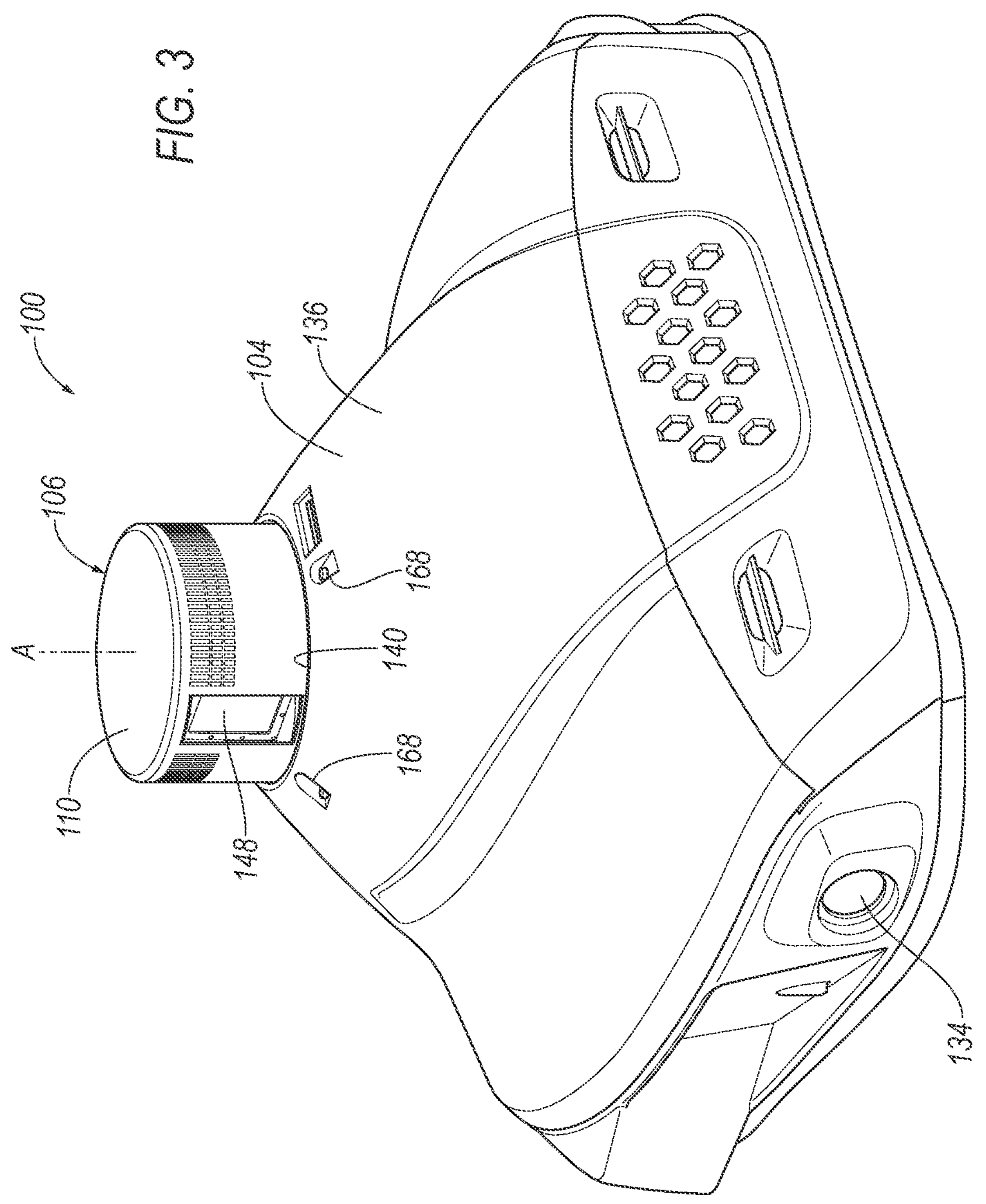
FIG. 3 is a rear perspective view of the sensor assembly.

With reference to FIG. 3, the housing 104 is mounted to the rigid structure 124 and covers the rigid structure 124. The housing 104 contains other sensors 134. The housing 104 includes an upper surface 136 facing away from the rigid structure 124, i.e., away from the body of the vehicle 102, and a lower surface 138 facing toward the rigid structure 124, i.e., toward the body of the vehicle 102 (shown in FIGS. 7 and 10). The housing 104 may be a single piece, i.e., a continuous piece of material with no internal seams separating multiple pieces. For example, the housing 104 may be stamped or molded as a single piece.

With reference to FIG. 4, the housing 104 includes the aperture 140 through which the sensor unit 106 passes. In the absence of the sensor unit 106 and the bracket 128, the aperture 140 exposes the rigid structure 124. The aperture 140 is round, e.g., has a circular or slightly elliptical shape. The aperture 140 is centered on the axis A.

Figure 5:
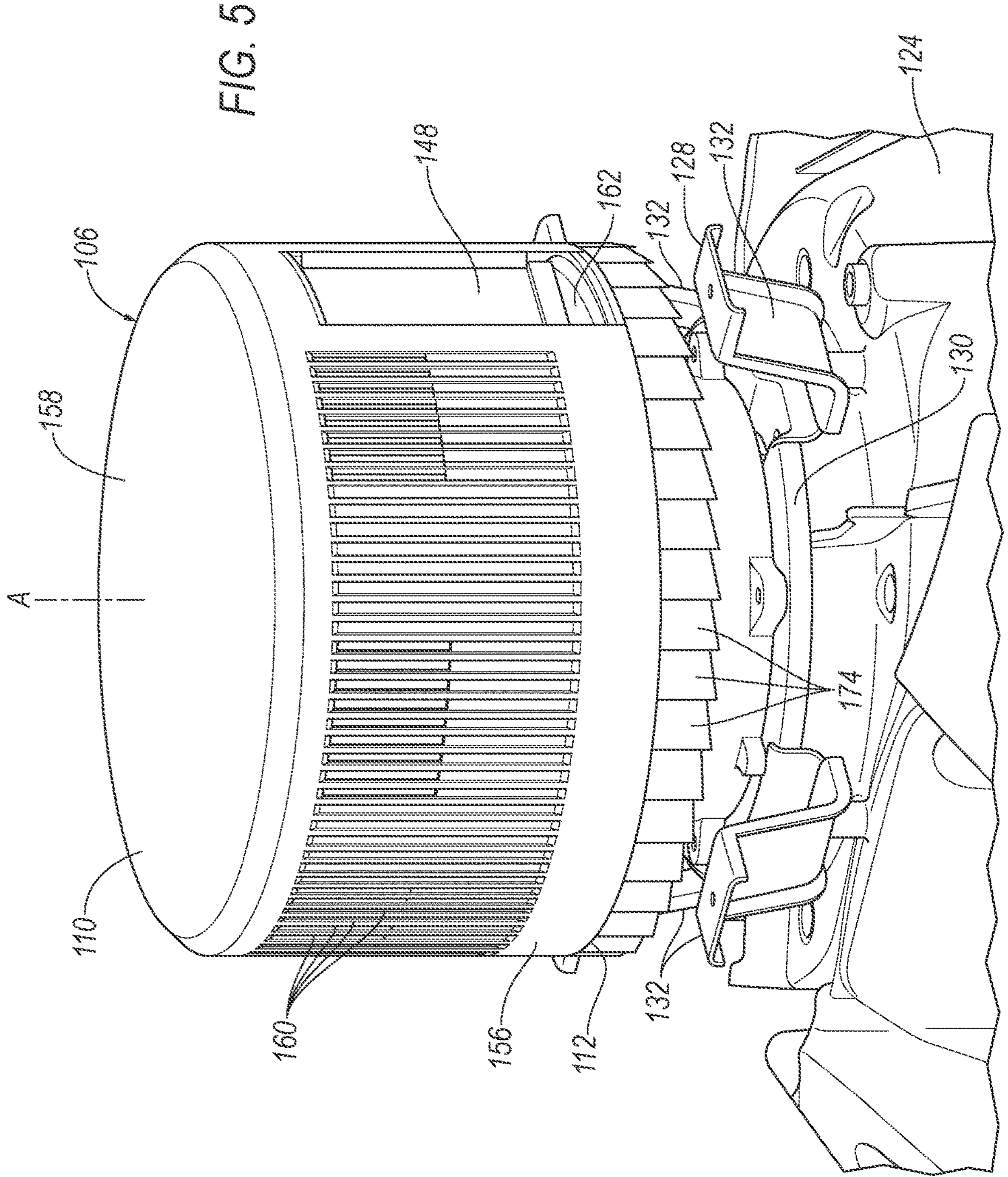
FIG. 5 is a perspective view of a portion of the sensor assembly with a housing and a gutter removed for illustration.

With reference to FIG. 5, the sensor unit 106 is attached, e.g., fastened, to the bracket 128, e.g., to the base 130 of the bracket 128. For example, the sensor unit 106 can be fastened to the rigid structure 124, e.g., through the base 130 of the bracket 128. The sensor unit 106 extends through the aperture 140, as seen in FIG. 3.

Returning to FIG. 2, the gutter 108 and the sensor unit 106 are both attached, e.g., fastened, to the bracket 128. The dimensional tolerancing of the sensor unit 106 relative to the gutter 108 may thereby be made more accurate. Specifically, the gap 176 between the gutter 108 and the cylindrical shell 110 of the sensor unit 106 can be kept at an intended size more reliably, permitting the intended size to be smaller for less airflow escaping. The dimensional tolerancing may be further made more accurate by the bracket 128 being a single piece, as well as by the gutter 108 and the sensor unit 106 directly contacting the bracket 128, i.e., being fastened without intermediate components.

Figure 6:
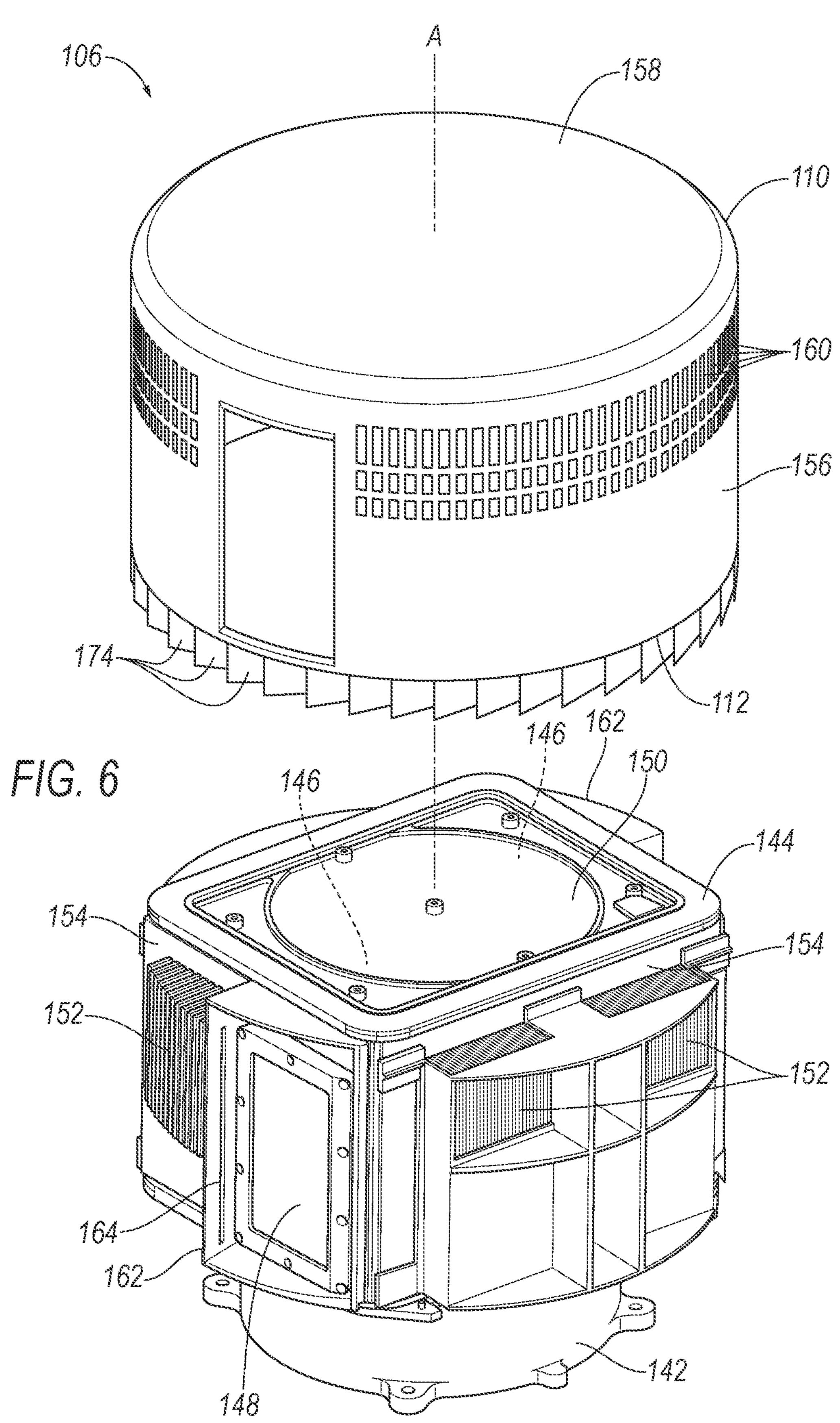
FIG. 6 is an exploded perspective view of the sensor unit.

With reference to FIG. 6, the sensor unit 106 includes a first motor 142, a sensor body 144, at least one sensing device 146, at least one sensor window 148, and the cylindrical shell 110. The first motor 142 is attached to and fixed relative to the bracket 128, as shown in FIG. 5. The sensor body 144, the at least one sensing device 146, the at least one sensor window 148, and the cylindrical shell 110 are fixed relative to each other and are rotatably drivably coupled to the first motor 142.

The first motor 142 is fixed relative to the bracket 128 and drivably coupled to the sensor body 144 and thereby drivably coupled to the cylindrical shell 110. The first motor 142 can be positioned to rotatably drive the sensor body 144 and the cylindrical shell 110 relative to the housing 104 in a first direction, e.g., clockwise as seen from above, at a first speed, e.g., 600 revolutions per minute. The first motor 142 can be any suitable type for rotating the sensing device 146, e.g., an electric motor. For example, the first motor 142 can include a stator (not shown) fixed relative to the bracket 128 and a rotor (not shown) rotatable by the stator around the axis A and fixed relative to the sensor body 144.

The sensor body 144 includes walls 154, e.g., four vertical walls 154 as shown in the Figures, and a top panel 150. The walls 154 can have the same horizontal length, i.e., the walls 154 can form a square horizontal cross-section. The horizontal cross-section can be centered on the axis A, i.e., the axis A intersects a geometric center of the horizontal cross-section of the sensor body 144, making the rotation of the sensor body 144 balanced. The top panel 150 extends horizontally to each wall 154. The sensing device 146 is contained inside the sensor body 144. The sensor body 144 is positioned inside the cylindrical shell 110 and fixed relative to the cylindrical shell 110.

The sensor body 144 can define a cavity radially between the sensor body 144 and the cylindrical shell 110 relative to the axis A. The cavity can extend continuously circumferentially around the sensor body 144 relative to the axis A. The term "continuously" in the context of this disclosure means that the cavity is unbroken about the axis A and air may move freely within the cavity and throughout the entire cavity. For example, a diagonal corner-to-corner distance across the top panel 150, i.e., a greatest width of the sensor body 144, can be less than an inner diameter of the cylindrical shell 110.

The sensor body 144 can include a plurality of thermal fins 152. The thermal fins 152 can be positioned on the walls 154. The thermal fins 152 can be oriented parallel to the axis A, i.e., axially relative to the axis A, e.g., elongated vertically along the respective wall 154 for the axis A being vertical. The thermal fins 152 can be positioned on all of the walls 154. The thermal fins 152 on each wall 154 can extend parallel to each other. The thermal fins 152 can extend perpendicularly from the respective wall 154. Each thermal fin 152 can have a length following a direction of elongation of the thermal fin 152 along the wall 154, a width perpendicular to the wall 154, and a thickness in a horizontal direction along the wall 154. The thermal fins 152 can extend along their respective widths radially outward relative to the axis A from the sensor body 144 toward the cylindrical shell 110. The length can be significantly greater than the width, e.g., more than twice as great. The width can be significantly greater than the thickness, e.g., more than five times as great. The thermal fins 152 can be integral with the walls 154. i.e., made of a single, uniform piece of material with no seams, joints, fasteners, or adhesives holding it together.

The thermal fins 152 can be thermally conductive, i.e., have a high thermal conductivity, e.g., a thermal conductivity equal to at least 15 watts per meter-Kelvin (W/(m K)), e.g., greater than 100 W/(m K), at 25° C. For example, the thermal fins 152, along with the walls 154, may be aluminum. The high thermal conductivity of the thermal fins 152 helps transfer away heat generated by the sensing device 146 inside the sensor body 144, as does the large surface area created by the geometry of the thermal fins 152.

The sensor unit 106 may be designed to detect features of the outside world; for example, the sensor unit 106 may be a radar sensor, an ultrasonic sensor, a scanning laser range finder, a light detection and ranging (LIDAR) device, or an image processing sensor such as a camera. In particular, the sensor unit 106 may be a LIDAR device, e.g., a scanning LIDAR device. A LIDAR device detects distances to objects by emitting laser pulses at a particular wavelength and measuring the time of flight for the pulse to travel to the object and back. The operation of the sensor unit 106 is performed by the at least one sensing device 146, e.g., a LIDAR sensing device, inside the sensor body 144. For example, the sensor unit 106 can include two sensing devices 146. The sensing devices 146 have fields of view through the sensor windows 148 encompassing a region from which the sensor unit 106 receives input. As the sensing devices 146 rotate, the fields of view encompass a horizontal 360° around the vehicle 102.

The sensor unit 106 can include at least one sensor window 148, e.g., two sensor windows 148, one sensor window 148 for each sensing device 146. The sensor windows 148 can each be positioned on one of the walls 154. Each sensor window 148 can be off-center on the respective wall 154. For example, the sensor window 148 can be positioned closer to a trailing edge of the respective wall 154 than a leading edge of the wall 154 with respect to the first direction of rotation of the sensor body 144. For example, each sensor window 148 can be positioned in a trailing half of the respective wall 154 with respect to the first direction of rotation. The sensor windows 148 can be flat. For example, the sensor windows 148 can have a rectangular shape. The sensor windows 148 are transparent with respect to whatever medium the sensing device 146 is capable of detecting. For example, if the sensor unit 106 is a LIDAR device, then the sensor windows 148 are transparent with respect to visible light at the wavelength generated and detectable by the sensing devices 146.

The cylindrical shell 110 is fixedly attached to the sensor body 144, e.g., fastened to the top panel 150 of the sensor body 144. The cylindrical shell 110 is rotatable around the axis A relative to the housing 104, along with the sensor body 144.

The cylindrical shell 110 can include a cylindrical portion 156 and an end portion 158. The end portion 158 can be flat and can have a circular shape. The end portion 158 can be attached, e.g., fastened, to the top panel 150 of the sensor body 144. The cylindrical portion 156 can have a cylindrical shape defining the axis A, which is vertical. The cylindrical portion 156 can have a constant circular cross-section extending upward along the axis A from the lower edge 112 to the end portion 158. The cylindrical shell 110 is open at the lower edge 112, thereby permitting airflow into the sensor unit 106 and permitting attachment of the sensor unit 106.

The cylindrical shell 110 includes a plurality of slits 160. The slits 160 extend through the cylindrical portion 156 and are elongated parallel to the axis A. The slits 160 can be positioned radially outward from the thermal fins 152 and are elongated parallel to the fins 152. As described below, the slits 160 permit airflow into the cylindrical shell 110 to exit from the cylindrical shell 110.

The sensor windows 148 can be recessed from the cylindrical shell 110. The sensor unit 106 can include window recesses 162 extending from the sensor window 148 and from the respective wall 154 radially outward to the cylindrical shell 110. The window recesses 162 can include passages 164 positioned to direct airflow entering the cylindrical shell 110 across the sensor window 148. For example, the passages 164 can be positioned in the first direction of rotation of the sensor body 144 from the respective sensor windows 148, i.e., as the sensor body 144 rotates, each passage 164 leads the respective sensor window 148. The passages 164 can extend vertically for a height of the respective sensor windows 148.

Figure 7:
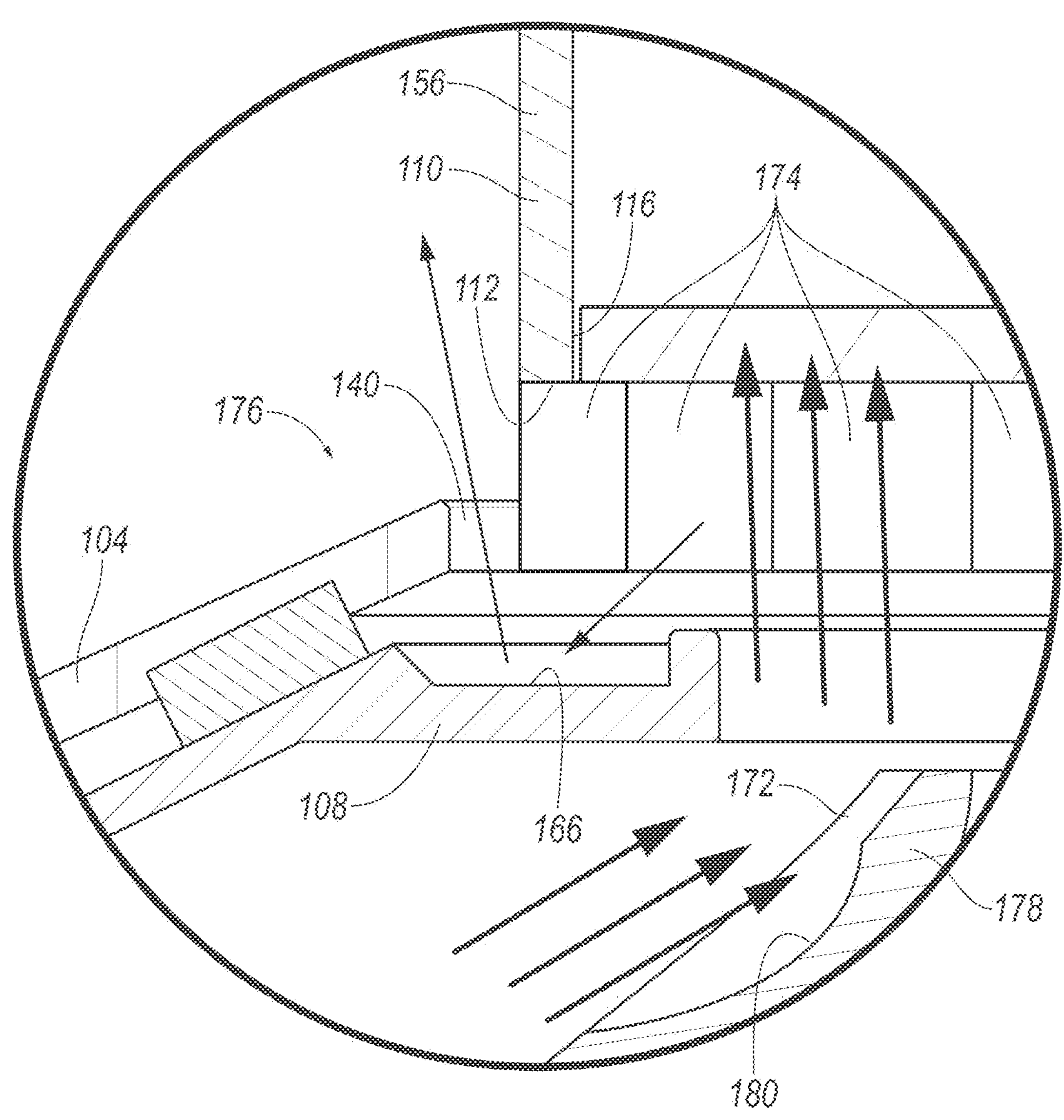
FIG. 7 is a perspective cross-sectional view of a portion of the sensor assembly.

With reference to FIG. 7, the aperture 140 of the housing 104 is a highest point of the housing 104. The lower edge 112 of the cylindrical shell 110 is positioned radially inside and below the aperture 140 relative to the axis A. The cylindrical shell 110 extends above the aperture 140, i.e., above the highest point of the housing 104. The lower edge 112 (or second airfoil blades 174 extending from the lower edge 112, as described below) is positioned slightly below the aperture 140, and most of the cylindrical shell 110 is exposed above the housing 104. Positioning the lower edge 112 or the second airfoil blades 174 below the aperture 140 can reduce airflow escaping while flowing from the housing 104 to the cylindrical shell 110.

The gutter 108 is elongated along the lower edge 112 of the cylindrical shell 110. The gutter 108 is positioned directly below the lower edge 112 relative to the axis A, i.e., straight downward. The gutter 108 includes a channel 166. The channel 166 has a u- or v-shaped cross-section that follows the lower edge 112 of the cylindrical shell 110. The channel 166, specifically the cross-section of the channel 166, extends from radially inside the lower edge 112 to radially outside the lower edge 112 relative to the axis A, as well as from radially inside the aperture 140 to radially outside the aperture 140 relative to the axis A. A radially outer edge of the channel 166 can be flush against the lower surface 138 of the housing 104 at or radially outside of the aperture 140 relative to the axis A. The position and shape of the gutter 108 helps the gutter 108 catch fluid, e.g., rain or washer fluid, draining from an outside surface of the cylindrical portion 156 of the cylindrical shell 110.

Returning to FIGS. 3 and 4, the housing 104 includes at least one drain hole 168, e.g., four drain holes 168, positioned to receive fluid from the gutter 108. The drain holes 168 extend radially outward relative to the axis A from the gutter 108. The drain holes 168 extend from the lower surface 138 of the housing 104 at the gutter 108, i.e., from inside the housing 104, to the upper surface 136 of the housing 104, i.e., to outside the housing 104. Fluid can flow from the gutter 108 through the drain holes 168 and down the housing 104 toward the roof 122 of the vehicle 102.

Figure 8:
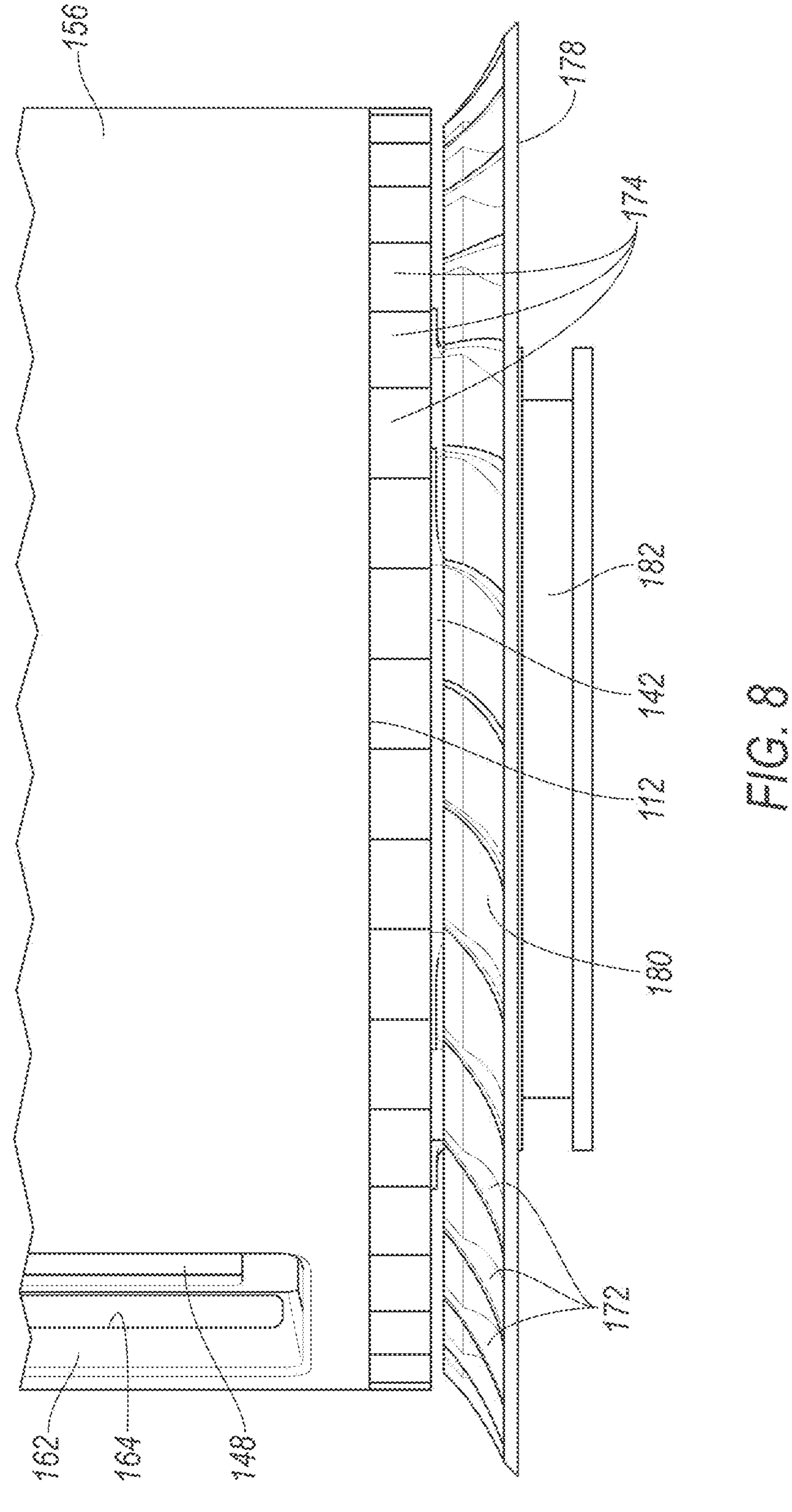
FIG. 8 is a side view of a portion of the sensor assembly with the housing and gutter removed for illustration.

With reference to FIG. 8, the sensor assembly 100 can include a ring 178. The ring 178 can extend circumferentially around the axis A. For example, the ring 178 can have an annular shape centered on the axis A. The ring 178 can be positioned along the axis A at the gap 176. The ring 178 can include a concave surface 180 facing radially outward relative to the axis A and facing toward the cylindrical shell 110, i.e., upward along the axis A. The shape of the concave surface 180 can be a revolution at a constant radius around the axis A of a curved line that is concave radially outward relative to the axis A and upward. The shape of the concave surface 180 can redirect airflow traveling radially inward from radially outside the ring 178 in an upward direction toward the inside of the cylindrical shell 110.

The ring 178 can be rotatable relative to the housing 104 around the axis A. For example, the sensor assembly 100 can include a second motor 182 that is positioned to rotatably drive the ring 178 relative to the housing 104 around the axis A. The second motor 182 can be positioned to rotatably drive the ring 178 relative to the housing 104 in a second direction, e.g., counterclockwise as seen from above, at a second speed, e.g., 3000 revolutions per minute. The second direction can be opposite the first direction that the first motor 142 drives the cylindrical shell 110. The opposing directions of rotation can help prevent air flowing upward from escaping through the gap 176. Alternatively, the second direction can be the same as the first direction. The second speed can be different than the first speed at which the first motor 142 drives the cylindrical shell 110, e.g., greater than the first speed. The high speed (combined with first airfoil blades 172 described below) can propel air sufficiently quickly to reduce air escaping through the gap 176. The second motor 182 can be any suitable type for rotating the ring 178, e.g., an electric motor. For example, the second motor 182 can include a stator (not shown) fixed relative to the bracket 128 and a rotor (not shown) rotatable by the stator around the axis A and fixed relative to the ring 178.

The sensor assembly 100 can include the first airfoil blades 172. The first airfoil blades 172 can be positioned at the gap 176 and can be positioned to interrupt airflow from the housing 104 through the aperture 140 into the cylindrical shell 110, i.e., at least some airflow paths from the housing 104 through the aperture 140 into the cylindrical shell 110 pass through the first airfoil blades 172. The first airfoil blades 172 can be fixed relative to the ring 178, e.g., attached to the ring 178 at the concave surface 180, e.g., extending radially outward and/or upward from the concave surface 180. The first airfoil blades 172 can be arranged circumferentially around the axis A, e.g., spaced equidistantly from each other around the axis A at a constant radius from the axis A and arranged and oriented rotationally symmetrically around the axis A.

The first airfoil blades 172 can be arranged to direct airflow axially into the cylindrical shell 110 relative to the axis A when the ring 178 rotates relative to the housing 104. In other words, the first airfoil blades 172 can be shaped to propel airflow upward into the cylindrical shell 110, given the second direction of rotation of the ring 178 by the second motor 182. For example, as the first airfoil blades 172 are elongated radially outward from the ring 178, the first airfoil blades 172 can curve in the second direction of rotation, and as the first airfoil blades 172 are elongated downward along the concave surface 180, the first airfoil blades 172 can curve in the second direction of rotation. Thus, as the second motor 182 rotates the ring 178, the first airfoil blades 172 push air radially inward and upward.

Figure 9:
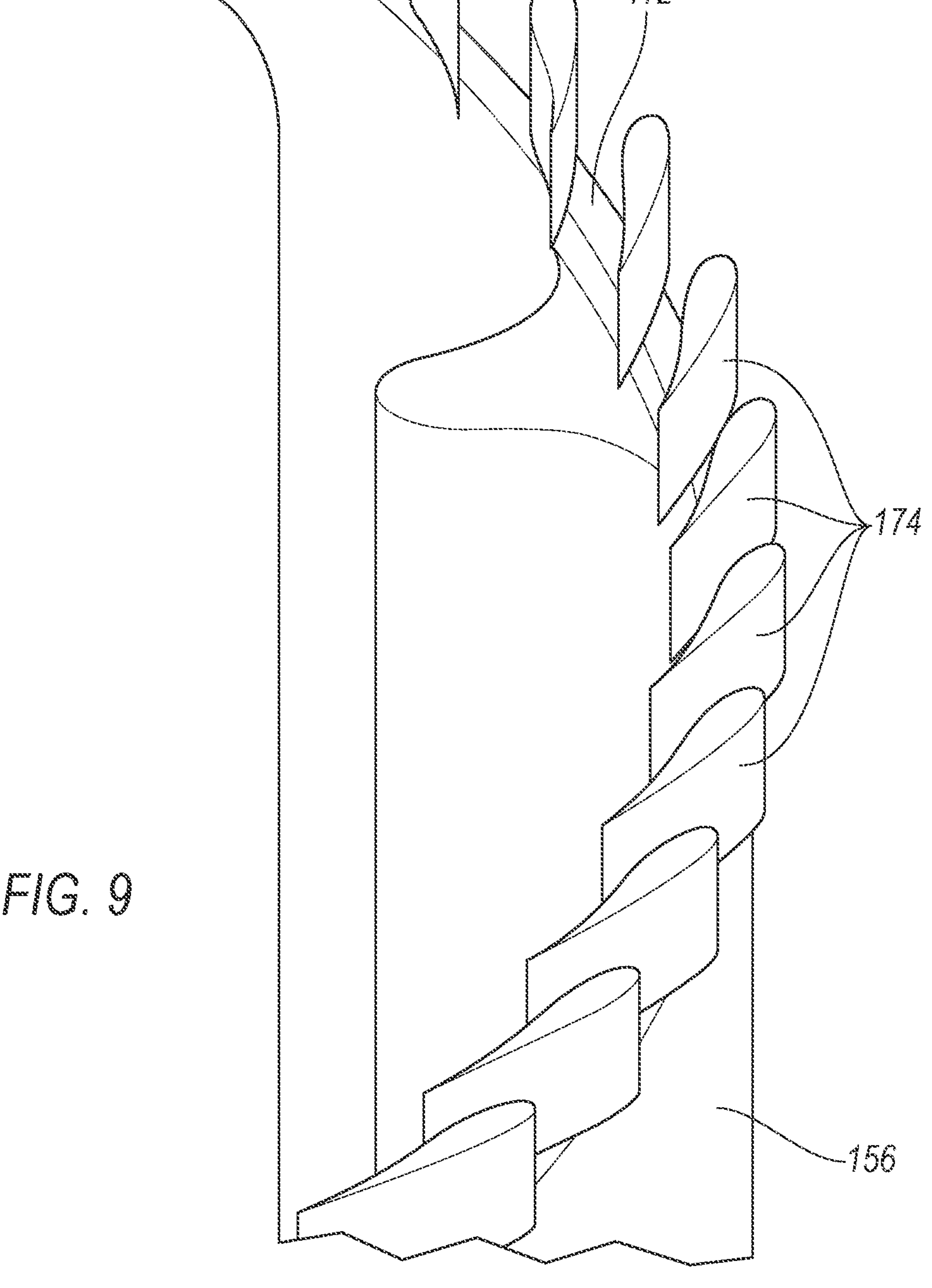
FIG. 9 is a perspective view of a portion of the sensor unit, turned upside-down for illustration.

With reference to FIG. 9, the sensor assembly 100 can include second airfoil blades 174. The second airfoil blades 174 can be positioned at the gap 176 and can be positioned to interrupt airflow from the housing 104 through the aperture 140 into the gap 176, i.e., at least some airflow paths from the housing 104 through the aperture 140 into the gap 176 pass through the second airfoil blades 174. The second airfoil blades 174 can be fixed relative to the cylindrical shell 110, e.g., attached to the cylindrical shell 110 at the lower edge 112, e.g., extending downward from the lower edge 112 into the gutter 108. The second airfoil blades 174 can be arranged circumferentially around the axis A, e.g., spaced equidistantly from each other around the axis A at a constant radius from the axis A and arranged and oriented rotationally symmetrically around the axis A.

The second airfoil blades 174 can be positioned to direct airflow from outside the housing 104 and cylindrical shell 110 into the gap 176 when the cylindrical shell 110 rotates. For example, the second airfoil blades 174 can be shaped and positioned to propel air at the gap 176 radially inward. The shapes of the second airfoil blades 174 can include cross-sections that are projected along the axis A from the lower edge 112 away from the cylindrical shell 110 into the gutter 108. The cross-sections of the second airfoil blades 174 can be elongated from a leading edge to a trailing edge in a direction that is radially inward and against the first direction of rotation of the cylindrical shell 110. Thus, as the first motor 142 rotates the cylindrical shell 110, the second airfoil blades 174 propel air that is caught by the leading edges of the second airfoil blades 174 radially inward through the gap 176.

Figure 10:
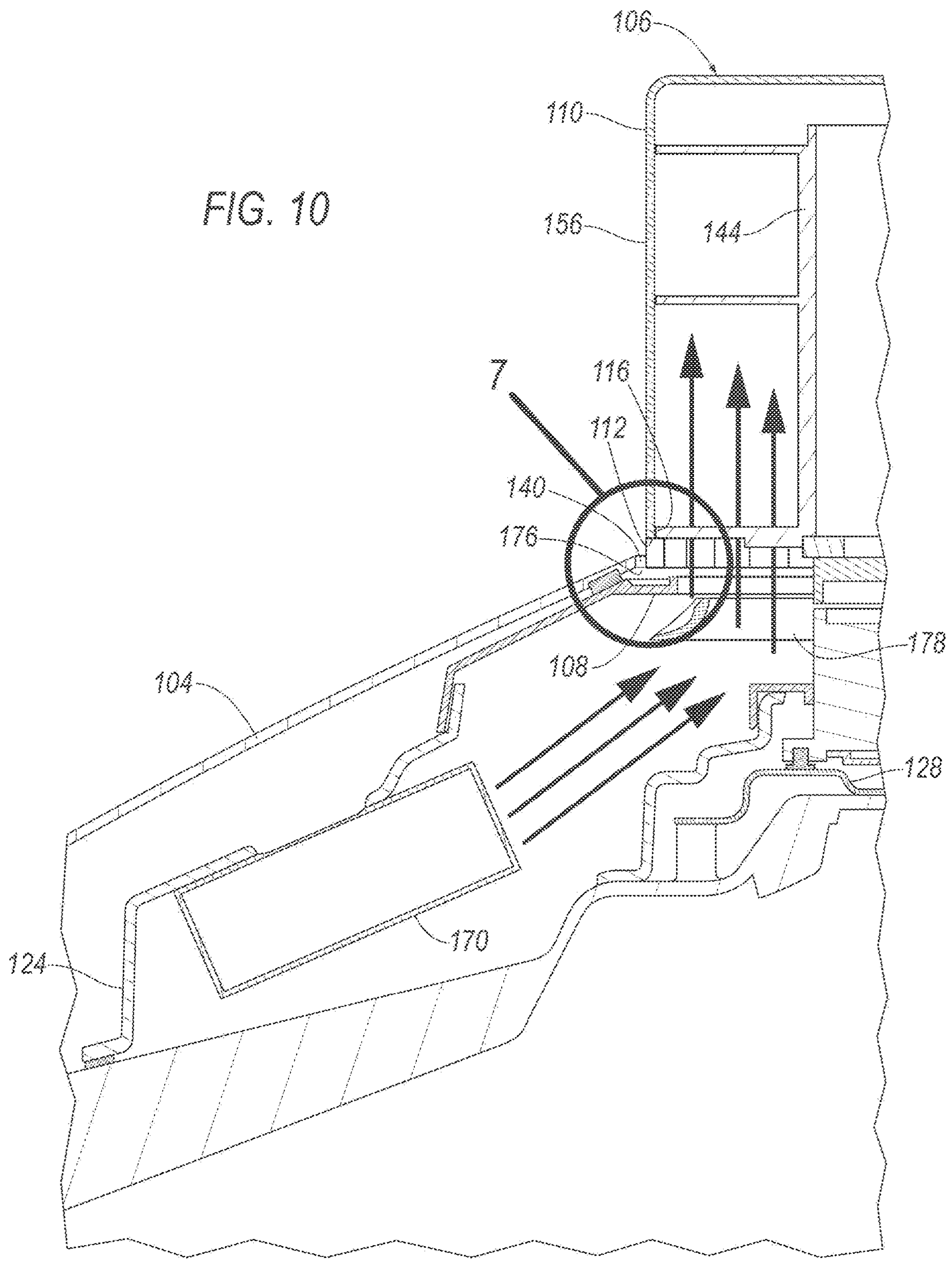
FIG. 10 is a diagrammatic side cross-sectional view of the sensor assembly.

With reference to FIG. 10, the sensor assembly 100 includes a pressurized-air source 170. The pressurized-air source 170 can be positioned inside the housing 104. The pressurized-air source 170 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type.

The pressurized-air source 170 can be positioned to supply airflow from the housing 104 through the aperture 140 into the cylindrical shell 110, e.g., to discharge airflow between the arms 132 of the bracket 128 and then through the airflow outlet 114 defined by the aperture 140. For example, the pressurized-air source 170 can be fluidly connected to a space between the rigid structure 124 and the housing 104 through which the pressurized air can flow to the bracket 128, then between the arms 132, then exiting through the airflow outlet 114. The aperture 140 defines the airflow outlet 114 passing radially inside the aperture 140 relative to the axis A, e.g., radially inside an inner edge of the channel 166 of the gutter 108.

The sensor unit 106 defines the airflow inlet 116 radially inside the lower edge 112 of the cylindrical shell 110 relative to the axis A. The airflow inlet 116 is positioned to receive airflow from the aperture 140, e.g., the airflow inlet 116 encircles the airflow outlet 114, i.e., the lower edge 112 or the second airfoil blades 174 encircle the radially inner edge of the channel 166 of the gutter 108. The thermal fins 152 and the slits 160 are positioned to receive airflow from the airflow inlet 116. For example, airflow that passes from the housing 104 through the airflow inlet 116 passes between the thermal fins 152 and then exits the sensor unit 106 through the slits 160. The airflow thus transfers heat from the sensor body 144, thereby cooling the sensor body 144 and the sensing device 146. The airflow is vertical through the airflow inlet 116, and the vertical orientation of the thermal fins 152 and the slits 160 facilitates smooth airflow.

The first airfoil blades 172 and the second airfoil blades 174 can provide for low levels of lost airflow from the housing 104 to the sensor unit 106. The first airfoil blades 172 when rotated by the second motor 182 can propel the airflow into the cylindrical shell 110 at a high rate of speed that provides reduced opportunity for the airflow to leak through the gap 176. The interface between the gutter 108 and the second airfoil blades 174 of the cylindrical shell 110 can provide for low levels of lost airflow from the housing 104 to the sensor unit 106. First, to escape, the airflow must pass through a small gap between the bottoms of the second airfoil blades 174 and the gutter 108, and the airflow must follow a twisting path above the radially inner edge of the channel 166, below or between the second airfoil blades 174, and above the aperture 140. This twisting path keeps losses low while permitting the cylindrical shell 110 to be spaced from the gutter 108 and the housing 104 so that the cylindrical shell 110 can rotate relative to the gutter 108 and the housing 104. Second, as the second airfoil blades 174 rotate, the second airfoil blades 174 push air radially inward into the gap 176, opposite the direction of airflow escaping, thereby interfering with the airflow escaping.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
a housing;
a sensor unit attached to the housing; and
an airfoil blade;
the sensor unit including a cylindrical shell defining a vertical axis;
the cylindrical shell being rotatable around the axis relative to the housing;
the cylindrical shell including a lower edge and extending along the axis from the lower edge;
the housing including an aperture centered on the axis;
the aperture defining an airflow outlet from the housing, airflow passing through the airflow outlet radially inside the aperture relative to the axis;
the sensor unit defining an airflow inlet, airflow passing through the airflow inlet radially inside the lower edge relative to the axis, the airflow inlet being positioned to receive airflow from the aperture;
and
the airfoil blade being positioned to interrupt airflow from the housing through the aperture.

2. The sensor assembly of claim 1, further comprising a plurality of airfoil blades including the airfoil blade, wherein the airfoil blades are arranged circumferentially around the axis.

3. The sensor assembly of claim 2, wherein the airfoil blades are spaced equidistantly from each other around the axis.

4. The sensor assembly of claim 1, further comprising a pressurized-air source positioned to supply the airflow from the housing through the aperture into the cylindrical shell.

5. The sensor assembly of claim 1, further comprising a ring positioned along the axis below the lower edge of the cylindrical shell and rotatable relative to the housing around the axis, the airfoil blade being fixed relative to the ring.

6. The sensor assembly of claim 5, wherein the airfoil blade is arranged to direct airflow axially into the cylindrical shell relative to the axis when the ring rotates relative to the housing.

7. The sensor assembly of claim 5, wherein the cylindrical shell is rotatable around the axis in a first direction, and the ring is rotatable around the axis in a second direction opposite the first direction.

8. The sensor assembly of claim 7, wherein the airfoil blade is a first airfoil blade, the sensor assembly further comprising a second airfoil blade fixed relative to the cylindrical shell, wherein the second airfoil blade is positioned to direct outside air between the aperture and the lower edge when the cylindrical shell rotates.

9. The sensor assembly of claim 5, further comprising a first motor positioned to rotatably drive the cylindrical shell relative to the housing at a first speed, and a second motor positioned to rotatably drive the ring relative to the housing at a second speed different than the first speed.

10. The sensor assembly of claim 9, wherein the second speed is greater than the first speed.

11. The sensor assembly of claim 5, wherein the ring extends circumferentially around the axis.

12. The sensor assembly of claim 5, wherein the ring includes a concave surface facing radially outward relative to the axis and facing toward the cylindrical shell, and the airfoil blade extends from the concave surface.

13. The sensor assembly of claim 1, wherein the airfoil blade is fixed relative to the cylindrical shell.

14. The sensor assembly of claim 13, wherein the airfoil blade is positioned to direct airflow into the gap outside air between the aperture and the lower edge when the cylindrical shell rotates.

15. The sensor assembly of claim 13, wherein a shape of the airfoil blade includes a cross-section that is projected along the axis from the lower edge away from the cylindrical shell.

16. The sensor assembly of claim 15, further comprising a gutter fixed relative to the housing and extending around the aperture, wherein the gutter is elongated along the lower edge and positioned directly below the lower edge relative to the axis, and the airfoil blade extends from the lower edge toward the gutter.

17. The sensor assembly of claim 1, further comprising a gutter fixed relative to the housing and extending around the aperture, wherein the gutter is elongated along the lower edge and positioned directly below the lower edge relative to the axis.

18. The sensor assembly of claim 17, wherein the gutter includes a channel extending from radially inside the lower edge to radially outside the lower edge relative to the axis.

19. The sensor assembly of claim 1, wherein the sensor unit includes a sensor body fixed relative to the cylindrical shell and defining a cavity radially between the sensor body and the cylindrical shell relative to the axis, and the cavity extends continuously circumferentially around the sensor body relative to the axis.

20. The sensor assembly of claim 1, wherein the sensor unit includes a LIDAR sensing device.

* * * * *